Sept. 5, 1944.  U. L. HARMON  2,357,513
SEALING STRIP AND METHOD OF MAKING SAME
Filed Nov. 24, 1941  3 Sheets-Sheet 2
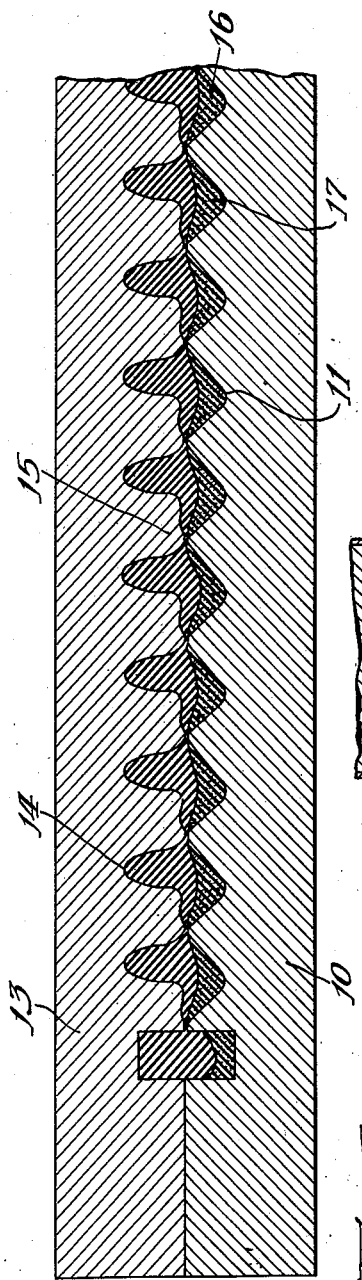
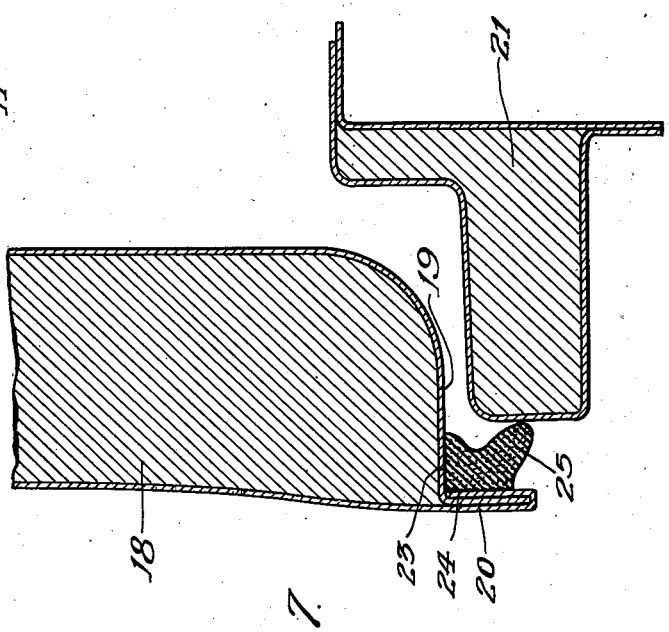
Inventor:
Ulrich L. Harmon,
By Zabel, Carlson, Gritzbaugh & Wells
Attorneys Sept. 5, 1944. U. L. HARMON 2,357,513
SEALING STRIP AND METHOD OF MAKING SAME
Filed Nov. 24, 1941 3 Sheets-Sheet 3
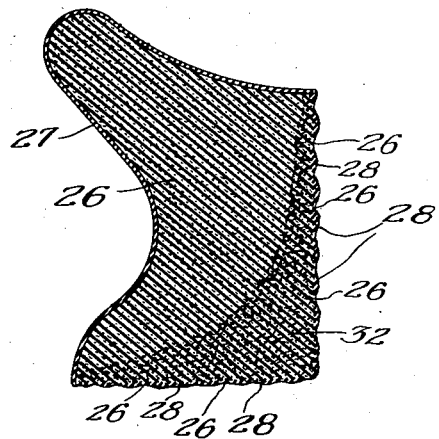
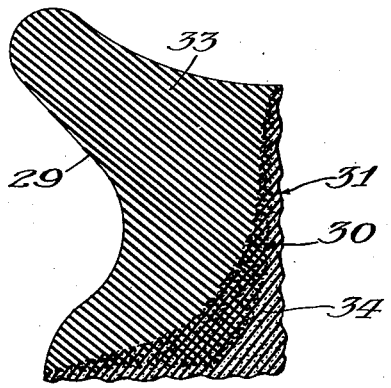
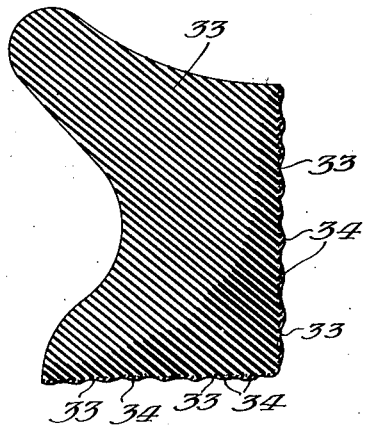

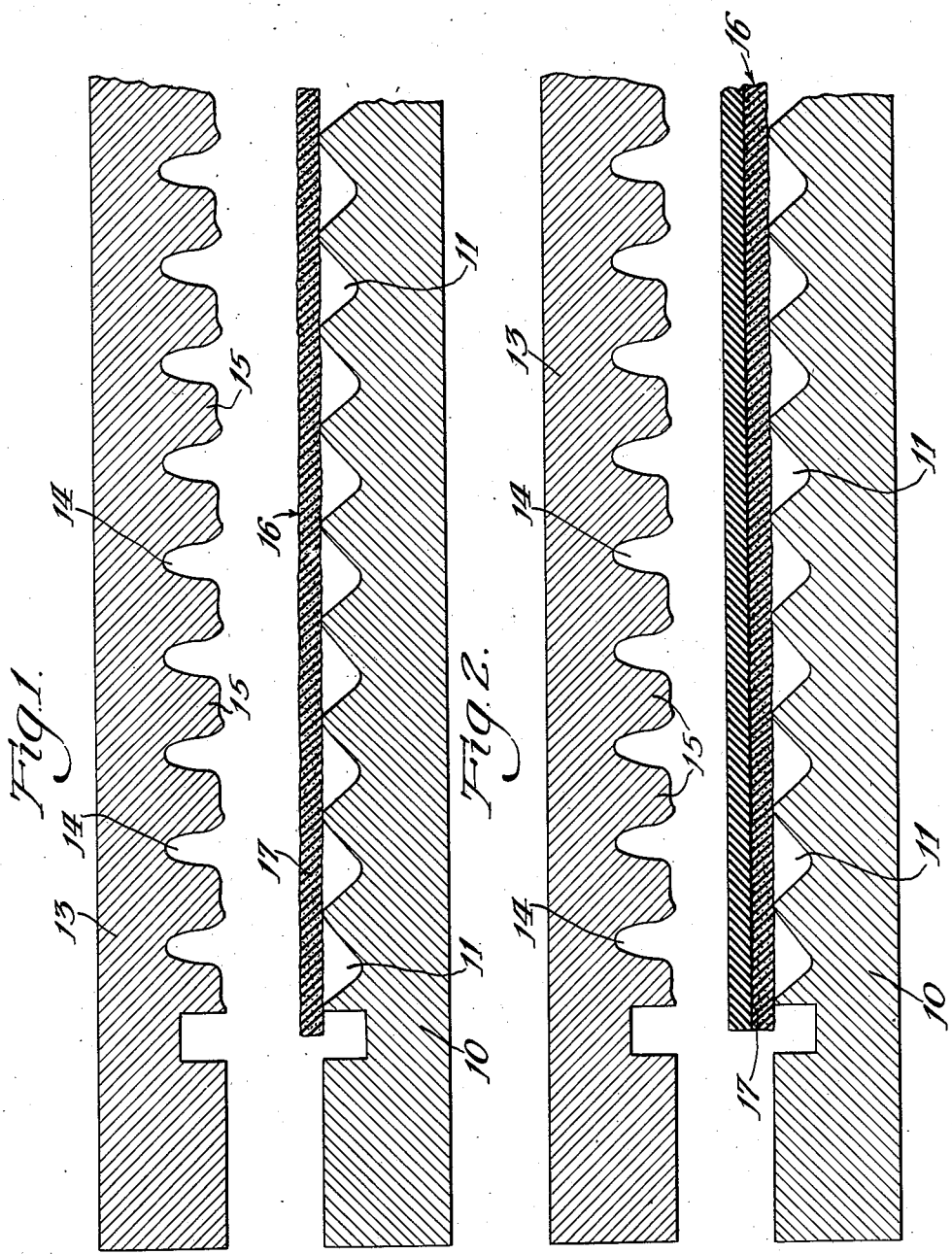

Patented Sept. 5, 1944

2,357,513

UNITED STATES PATENT OFFICE 2,357,513

SEALING STRIP AND METHOD OF MAKING SAME

Ulrich L. Harmon, Oak Park, Ill., assignor to Dryden Rubber Company, Chicago, Ill., a corporation of Illinois Application November 24, 1941, Serial No. 420,252

15 Claims. (Cl. 20—69)

The invention relates to a sealing strip and a method of preparing same. It relates particularly to sealing strips such as are used on automobile doors, trunks and refrigerator doors.

An object of the invention is to provide a sealing strip having a specially prepared surface for cementing the strip to metal, wood, glass or other surfaces.

Another object is to provide a quick and economical process for making the improved type of sealing strip.

Other objects and advantages of the invention will become apparent as the following detailed description progresses, reference being had to the accompanying drawings, wherein Fig. 1 is a cross sectional view of a mold assembly with the mold in open position, showing the first step in the molding process;

Fig. 2 is a cross sectional view of a mold assembly with the mold in open position, showing the second stage in the process;

Fig. 3 is a cross sectional view of a mold assembly, showing the mold closed in the final stage of the process;

Fig. 4 is a cross sectional view of one type of sealing strip produced in accordance with my invention;

Fig. 5 is a cross sectional view of another type of sealing strip made in accordance with my invention; and Fig. 6 is a cross sectional view of a third type of sealing strip made in accordance with the invention.

Fig. 7 is a sectional view of a car door and door sill showing the manner of mounting a sealing strip made in accordance with my invention on the door.

Referring to the drawings, the numeral 10 designates the bottom plate of a mold having depressed areas 11. The numeral 13 designates a top plate of a mold having depressed areas 14 and 15.

In the practice of the invention, a sheet of vulcanized skin-free cellular rubber 16 having cells 17 is placed on the bottom plate 10 of the mold, as shown in Fig. 1. Then a sheet of unvulcanized rubber containing a curing agent, preferably also a blowing agent, is superimposed on the vulcanized cellular rubber, as shown in Fig. 2. The mold is then closed, as shown in Fig. 3, and heat is applied to vulcanize the unvulcanized rubber. In the process the unvulcanized rubber is blown, flowed or is pressed into and through the cells of the vulcanized cellular rubber to a greater or lesser extent, depending upon the pressure and the amount of pre-vulcanized rubber and unvulcanized rubber.

In the preferred practice of the invention, the unvulcanized rubber composition is forced through the cells to such an extent that it forms a part of the outer surface in conjunction with a part of the pre-vulcanized cellular rubber. In another embodiment the unvulcanized rubber composition is forced a substantial distance through the cells but not to such an extent as to reach the outer surface so that the outer surface is composed entirely of the prevulcanized cellular rubber. In both instances, the outer surface formed at the bottom of the mold is a rough or broken surface having a greater cementing area than the smooth surface formed by vulcanizing an unvulcanized rubber composition in a mold.

In carrying out the process the unvulcanized rubber composition which is vulcanized in the mold in conjunction with the pre-vulcanized sponge rubber may contain both curing agents and blowing agents, or may contain curing agents without the blowing agents. When a blowing agent such as sodium bicarbonate or ammonium bicarbonate, or any of the common agents used for this purpose in the art, is used the heat required to vulcanize the rubber composition decomposes the blowing agent and produces sufficient pressure to force the composition into the pre-vulcanized layer without the necessity of any external pressure. However, when a blowing agent is omitted from the unvulcanized rubber composition, external pressure such as hydraulic pressure applied to the mold should be used to force the composition into the cells of the pre-vulcanized rubber.

The process of this invention may be carried out with any type of pre-vulcanized cellular rubber, including cellular rubber having interconnected cells such as chemically blown vulcanized rubber and foamed latex vulcanized sponge rubber; and cellular rubber in which the cells are not connected such as most types of gas blown rubber. In the case of vulcanized sponge rubber having non-communicating cells the process of this invention appears to force the unvulcanized rubber composition in the mold through the cells by breaking the thin walls between the cells. Whether or not an interconnected cell sponge rubber is used, the sponge rubber should at least have the surface forming the outer surface free of skin and preferably should have both surfaces free of skin in order that the unvulcanized rubber composition may be forced a substantial distance into and through the cells of the pre-vulcanized sponge rubber. The cellular rubber which has an open rough surface such as is obtained when the skin is sliced off a sponge rubber cake containing skin, is referred to in this specification and claims as open cell cellular rubber or open cell sponge rubber.

The process of the invention is particularly applicable to making sealing strips adapted to be fitted and cemented into a corner. It will be noted that in the process as illustrated the vulcanized sponge rubber is bent or strained to form surfaces extending at angles to each other so that the sealing strip may be placed in the corner and cemented to metal or like walls forming the corner of a door. The assembly of a sealing strip on a car door of this type is shown in Fig. 7. In this view a car door 18 having horizontally extending walls 19 and vertically extending walls 20 is shown in partially closed condition in conjunction with a sill 21. The sealing strip 22 has a rough surface formed of pre-vulcanized cellular rubber, the rough surface extending along two sides 23 and 24 of the strip so that the strip may be cemented by a rubber cement to the walls 19 and 20 of the door. The portion of the strip forming the tip 25 which is adapted to first contact the sill 21 has a smooth surface produced by the contact of the mold vulcanized rubber with the top surface of the mold.

The preferred type of sealing strip is that shown in Fig. 4, in which a mold vulcanized sponge rubber composition 26 extends through the cells of a pre-vulcanized sponge rubber composition 28 to form a mixture 32 and a rough surface with the pre-vulcanized sponge rubber 28, the rough surface being made up of intermittent portions of the mold vulcanized rubber 26 and the pre-vulcanized rubber 28. The surface which is remote from the pre-vulcanized sponge rubber and which is made by the top portion of the mold has a smooth dense rubber skin 27 which extends around the strip until it meets the rough surface 26 and 28. This surface 26 and 28 is rough because the pre-vulcanized rubber 28 is unflowed during the molding process, and therefore has much greater cementing area than the smooth dense skin 27.

The strip shown in Fig. 4 is similar in resiliency to the sponge rubber strips known to the prior art which have a dense smooth skin around the entire surface, but is much superior to these prior art sponge rubber strips in that it can be securely cemented to the metal or other material of a door and will not separate from the metal after a short period of time.

In the sealing strip shown in Fig. 5, the rubber composition which is vulcanized in the mold contains curing agents but no blowing agent so that the surface 29 which is in contact with the top mold plate is a smooth surface of dense vulcanized rubber 33 which extends into the interior of the strip and a substantial distance into and through the cells of the pre-vulcanized open cell sponge rubber 34 as shown by the cross hatching in Fig. 5. The dense vulcanized rubber 33 extends to within close proximity of the surface of the pre-vulcanized rubber 34, as shown along line 30, leaving a surface 31 composed entirely of the pre-vulcanized sponge rubber 34. This gives a rough surface having a large cementing area.

In the strip shown in Fig. 6 the dense rubber 33 is forced to the surface of the pre-vulcanized rubber to form a surface composed partly of dense rubber 33 and partly of sponge rubber 34.

To more clearly set forth the practice in accordance with the invention, and to more specifically point out the method of manufacture, the following examples illustrate the procedure used to produce a door sealing strip used on automobiles which has given satisfactory results, but it is understood that these examples are not intended to restrict the invention to the specific details disclosed.

*Example I*

A cake of large cell gas blown sponge rubber 2½ in. thick, 48 in. wide, 76 in. long, containing sulfur and an accelerator in suitable proportions, was vulcanized in open steam for 192 min. to give a soft vulcanized rubber sponge.

This vulcanized sponge rubber was then cut into smaller cakes, 14½ in. by 30 ins. The outer skin was then sliced off these cakes in a slicing machine and the remaining open cell sponge rubber was sliced into sheets approximately $\frac{3}{16}$ in. thick. Three of these 30 in. sheets were spliced together with rubber cement to make a flexible sheet 90 in. long.

This 90 in. sheet of vulcanized sponge rubber was then placed on the bottom plate 10 of an 18 in. door sealing strip mold, as shown in Figs. 1, 2 and 3.

On top of this vulcanzed sponge rubber sheet was laid a sheet of unvulcanized compounded rubber containing curing agents and blowing agents, this sheet being of the same dimensions as the vulcanized rubber sheet. This is illustrated in Fig. 2. The unvulcanized compounded rubber contained sulfur, accelerator and blowing agents such as sodium bicarbonate and ammonium bicarbonate in proportions well known to the art to give a soft vulcanized sponge rubber sheet on heating for 20 min. at 75 lbs. steam pressure.

The mold was then closed, as shown in Fig. 3, and heated for 20 min. at 75 lbs. steam pressure. This results in the vulcanization of the unvulcanized rubber. During the process of vulcanization the compounded rubber is blown, flowed and pressed into the open cells of the previously vulcanized sponge rubber. In this particular example, it impregnates the open cell pre-vulcanized rubber substantially to the outer surface but not sufficiently to even or smooth off the surface of the open cells, thereby leaving a roughened or broken surface to which cement is adapted to adhere to a greater extent than with the smooth surface obtained by molding and vulcanizing a vulcanizable rubber composition.

The vulcanized sheet made by the above process containing 18 strips is then cut apart, cut to length and is ready for shipment.

Fig. 4 shows the application of one of these sealing strips to an automobile door, which application is generally done by the automobile manufacturer.

*Example II*

The process is the same as in Example I, except that the unvulcanized compounded rubber contains the curing agents but no blowing agents. In this particular example, hydraulic pressure was applied to the mold sufficient to force the compounded rubber a substantial distance into the pre-vulcanized cellular rubber. The type of strip produced by this process is shown in Fig. 5. By increasing the pressure the compounded rubber may be forced substantially to the surface as shown in Fig. 6.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

In place of the pre-vulcanized cellular rubber used in the process of this invention, there may be used any other open cell sponge or cellular material which is non-thermoplastic so it will not flow to a smooth surface during the molding process. Such material as cellulose sponge has been tried by me but does not give as good results as rubber or rubber-like material. It is to be understood that the term "rubber" as used in the claims is intended to include rubber and rubber-like materials in general, including the various butadiene and copolymer butadiene rubbers, neoprene and like rubber-like materials which can be molded and processed similar to natural rubber.

I claim:

1. The method which comprises superimposing a layer of unvulcanized rubber containing a curing agent upon a layer of open cell cellular rubber and applying heat and pressure to the composite mass sufficient to vulcanize and force said compounded rubber a substantial distance into the cells of the cellular rubber but insufficient to produce an even, smooth surface at the outer surface of the pre-vulcanized cellular rubber.

2. The method which comprises superimposing a layer of unvulcanized rubber containing a curing agent upon a layer of open cell cellular rubber and applying heat and pressure to the composite mass sufficient to vulcanize and force said compounded rubber a substantial distance into the cells of the cellular rubber and in close proximity to the outer surface of the prevulcanized cellular rubber.

3. The method which comprises superimposing a layer of unvulcanized rubber containing a curing agent upon a layer of vulcanized open cell cellular rubber, and applying heat and pressure to the composite mass sufficient to vulcanize and force said compounded rubber through the cells of the pre-vulcanized rubber to the outer surface so as to form with said pre-vulcanized rubber a rough surface composed partly of said compounded vulcanized rubber and partly of the pre-vulcanized rubber.

4. The method which comprises superimposing a layer of unvulcanized rubber containing a curing and blowing agent upon a layer of open cell cellular rubber and applying heat to the composite mass sufficient to vulcanize and force said compounded rubber a substantial distance into the open cells of the cellular rubber but insufficient to produce an even, smooth surface at the outer surface of the pre-vulcanized cellular rubber.

5. The method which comprises superimposing a layer of unvulcanized rubber containing a curing and blowing agent upon a layer of open cell cellular rubber and applying heat to the composite mass sufficient to vulcanize and force said compounded rubber a substantial distance into the open cells of the cellular rubber and in close proximity to the outer surface of the pre-vulcanized cellular rubber.

6. The method which comprises superimposing a layer of unvulcanized rubber containing a curing and blowing agent upon a layer of vulcanized open cell cellular rubber, and applying heat to the composite mass sufficient to vulcanize and force said compounded rubber through the cells of the pre-vulcanized rubber to the outer surface so as to form with said pre-vulcanized rubber a rough surface composed partly of said compounded vulcanized rubber and partly of the mold vulcanized rubber.

7. The method of making a sealing strip or the like article of manufacture which comprises placing a sheet of open cell cellular rubber upon a mold plate having depressed areas into which said sheet is adapted to be pressed, placing a sheet of unvulcanized rubber containing a curing agent and a blowing agent on said vulcanized cellular sheet and beneath a mold plate having areas into which said rubber composition is adapted to flow, bringing the mold plates together to force said sheets into the mold areas, and applying heat to vulcanize the unvulcanized rubber and force said rubber a substantial distance through the cells of the pre-vulcanized rubber.

8. The method of making a sealing strip or the like article of manufacture which comprises placing a sheet of open cell cellular rubber upon a mold plate having depressed areas into which said sheet is adapted to be pressed, placing a sheet of unvulcanized rubber containing a curing agent and a blowing agent on said vulcanized cellular sheet and beneath a mold plate having areas into which said rubber composition is adapted to flow, bringing the mold plates together to force said sheets into the mold areas, and applying heat to vulcanize the unvulcanized rubber and force said compounded rubber a substantial distance into the cells of the cellular rubber and in close proximity to the outer surface of the pre-vulcanized cellular rubber.

9. The method of making a sealing strip or the like article of manufacture which comprises placing a sheet of open cell cellular rubber upon a mold plate having depressed areas into which said sheet is adapted to be pressed, placing a sheet of unvulcanized rubber containing a curing agent and a blowing agent on said vulcanized cellular sheet and beneath a mold plate having areas into which said rubber composition is adapted to flow, bringing the mold plates together to force said sheets into the mold areas, and applying heat to vulcanize the unvulcanized rubber and force said compounded rubber through the cells of the pre-vulcanized rubber to the outer surface so as to form with said pre-vulcanized rubber a rough surface composed partly of said compounded vulcanized rubber and partly of the pre-vulcanized rubber.

10. A sealing strip comprising a layer of dense rubber united to a layer of cellular rubber, said dense rubber extending a substantial distance into the cells of said cellular rubber.

11. A sealing strip comprising a main layer of rubber having a smooth, non-porous face and a layer of open cell cellular rubber united thereto so that the rubber of said main layer extends a substantial distance into the cells of said cellular layer, said cellular layer extending beyond said main layer to form a rough surface.

12. A sealing strip comprising a main layer of rubber having a smooth, non-porous face, and a layer of open cell cellular rubber united thereto so that the rubber of said main layer extends a substantial distance into the cells of said cellular rubber and in close proximity to the outer surface of said cellular rubber.

13. A sealing strip comprising a main layer of rubber having a smooth, non-porous face, and a layer of open cell cellular rubber united thereto, said main layer of rubber extending through the cells of said open cell rubber to form with said open cell rubber a rough surface composed partly of the rubber of said main body and partly the rubber of said open cell rubber.

14. In combination, a closing member, a member against which said closing member is adapted to fit when said closing member is in closed position, a sealing body between said members, said sealing body comprising a rubber body having a portion of its surface consisting of a rough surface formed of sponge rubber, and an adhesive composition against said rough surface and a surface of one of said members for securing said sealing body in position.

15. In combination, a door having a portion of its bottom extending at an angle to form a corner, a sill adapted to fit in said corner, a sealing strip in said corner of said door, said sealing strip consisting of a rubber strip comprising a body of rubber having a smooth, dense surface adapted to strike against said sill, and a relatively thin layer of sponge rubber having a rough surface united to said main body and bent around said main body so that it fits in said door corner, and an adhesive composition against said rough surface and said door to secure said sealing strip to said door.

ULRICH L. HARMON.